United States Patent [19]

Egawa

[11] 4,185,614
[45] Jan. 29, 1980

[54] HEAT-PRESERVING APPLIANCE FOR CUPS OR OTHER VESSELS

[75] Inventor: Eiko Egawa, Tokyo, Japan

[73] Assignee: Ineko Watanabe, Tokyo, Japan; a part interest

[21] Appl. No.: 855,420

[22] Filed: Nov. 28, 1977

[30] Foreign Application Priority Data

Dec. 9, 1976 [JP] Japan .......................... 51-164083[U]

[51] Int. Cl.² ............................................. F23C 1/00
[52] U.S. Cl. ..................................... 126/265; 126/43; 126/49
[58] Field of Search .................. 126/261, 246, 43, 45, 126/46, 47, 48, 49, 265; 431/298, 306, 316, 319

[56] References Cited

U.S. PATENT DOCUMENTS 160,451  3/1875  McKinley ............................ 431/316

FOREIGN PATENT DOCUMENTS 318758  3/1957  Switzerland ............................... 126/43

*Primary Examiner*—Samuel Scott
*Assistant Examiner*—Lee E. Barrett
*Attorney, Agent, or Firm*—Blanchard, Flynn, Thiel, Boutell & Tanis

[57] ABSTRACT

Disclosed is a heat-preserving appliance for cups or other vessels having a saucer in which fuel, a wick for assisting the combustion of the fuel and a support member for supporting a cup or the like are detachably mounted. As the fuel is burnt while the cup is placed on the saucer, the temperature of the contents of the cup is maintained by a weak flame for the desired time length. The saucer can have a shape, construction and design selected to match those of the cup or the like, so as to be used on a dining table without spoiling the atmosphere of the dinner.

7 Claims, 6 Drawing Figures

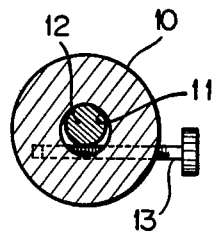
FIG. 3
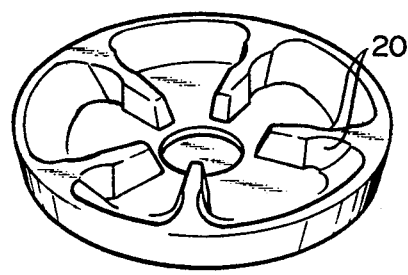
FIG. 4
FIG. 5
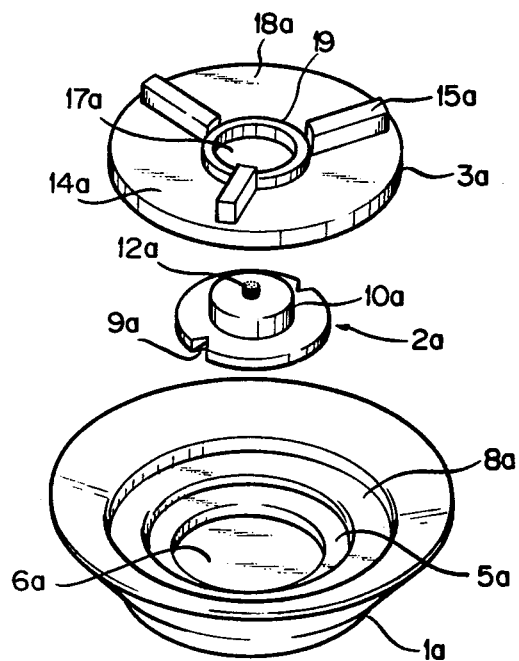
FIG. 6
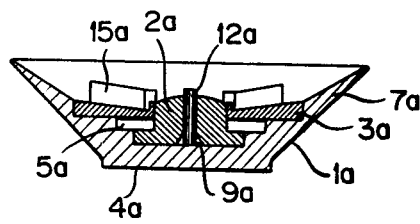

HEAT-PRESERVING APPLIANCE FOR CUPS OR OTHER VESSELS

BACKGROUND OF THE INVENTION

The present invention relates to a heat-preserving appliance for cups and, more particularly, to a heat-preserving appliance for cups containing coffee, tea, soup and so forth, so as to maintain the temperature of the contents to preserve the taste and flavor of the same for a considerably long period of time.

Most of the existing appliances for the above stated purpose are of the burner type relying on the combustion of a liquid or solid fuel, the portable cooking-stove type or the electric heater type.

Among these types of heat-preserving appliances, the burner type the portable stove type of devices are designed mainly for heating rather than heat insulation and, therefore, they require a complicated structure, as well as a large size. At the same time, the use of a fuel tank is indispensable, which renders the appliance not suitable for use on a table for enjoying a dinner. Concerning the electric heater type appliance, the structure is also complicated due to the heating coils incorporated in the device. In addition, the device of this type cannot be used unless electric power is available.

Furthermore, it is to be pointed out that these conventional heat-preserving and/or heating appliances have been considered and designed independently from and irrespective of the vessels for coffee, tea or soup, so that they do not match well the vessel in shape, structure and design, and, therefore, they cannot be used without spoiling the familiar atmosphere of the dinner.

SUMMARY OF THE INVENTION

It is therefore an object of the invention is to provide a heat-preserving appliance making use of a saucer having a shape, construction and design which will match those of coffee cups, tea cups, soup saucers and other dishes which are usually used on dining table, the saucer being adapted to incorporate therein fuel, a wick for burning the fuel and a supporting member for the cups or other dishes, so that the temperature of the dish on the supporting member may be maintained by a weak flame.

It is another object of the invention to provide a heat-preserving appliance for cups or other vessels, the appliance having a major part of a simplified shape and construction for an easy installation in a saucer-like main body which well matches the usual cups and other vessels and, therefore, is capable of extensive use.

It is still another object of the invention to provide a heat-preserving appliance for cups and other vessels in which the setting the fire on the wick and extinguishment of the fire can be made in a simple and easy manner.

These and other objects, as well as advantageous features of the invention will become clear from the following description of the preferred embodiment taken in conjunction with the attached drawings in which:

DESCRIPTION OF THE DRAWINGS

FIG. 3 is a sectional view taken along the line III—III of FIG. 1 and showing a bolt for adjusting the length of the wick, FIG. 4 is a perspective view of a modification of a support member, FIG. 5 is an exploded perspective view of a modification of the heat-preserving appliance, and FIG. 6 is a vertical sectional view of the modification as shown in FIG. 5.

DESCRIPTION OF THE PREFERRED EMBODIMENTS

Figure 1:
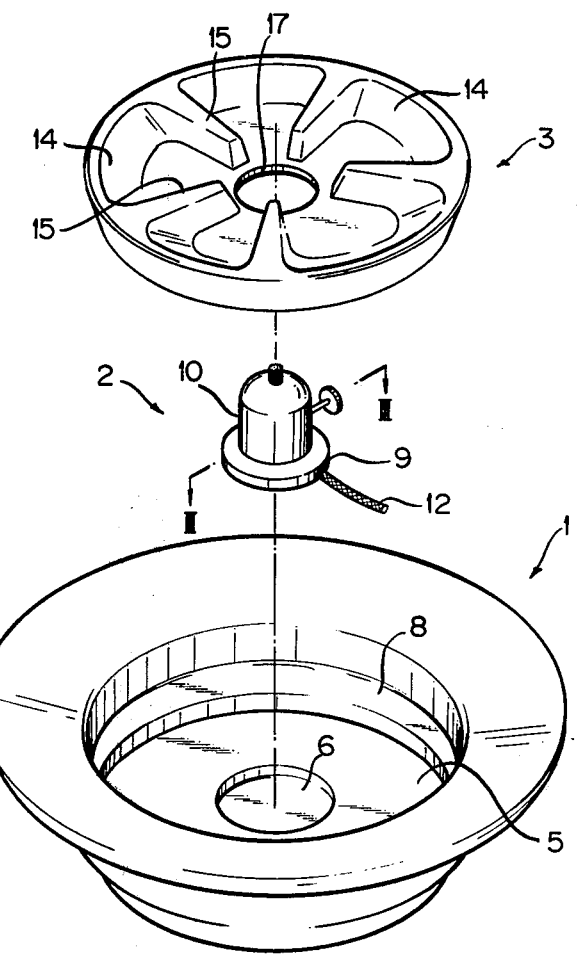
FIG. 1 is a exploded perspective view of a heat-insulating appliance, showing the manner of disassembling and assembling of the same.

Referring to the drawings, a heat-preserving appliance of the invention has, as its major parts, a saucer-like main body 1, a wick support 2 unitarily and detachably incorporated in the main body, and a support member 3.

The saucer-like main body 1 has at its bottom a fuel pan 5 and a bed 6 for the wick support. The bed 6 is adapted to locate the wick support 2 and to prevent the same from being displaced on the bottom 4 of the main body, and it has the form of a recess in the illustrated embodiment.

The main body 1 is further provided, at its inner peripheral portion 7, with a bed 8 for the support member 3, which bed, in the illustrated embodiment, is constituted by a step formed along the inner peripheral wall of the main body. The shape or profile and the construction, as well as the design, of the saucer-like main body are so determined as to well match the vessel 16 such as a cup which is to be placed thereon.

The wick support 2 has a base portion provided with a supplying groove 9 and a head portion 10 in which formed is a through bore 11. A wick is fed through the groove and the bore to project upwardly from the head portion 10.

A bolt 13 for adjusting the projecting length of the wick 12 is screwed to project into the through bore 11.

The support member 3 has a plurality of radial projections or ribs 15 for supporting a vessel 16 such as a cup or the like thereon, while the spaces 14 between the ribs 15 constitute passages for combustion air. The support member 3 further has a central bore 17 through which the head portion 10 of the wick support is to be projected.

Figure 2:
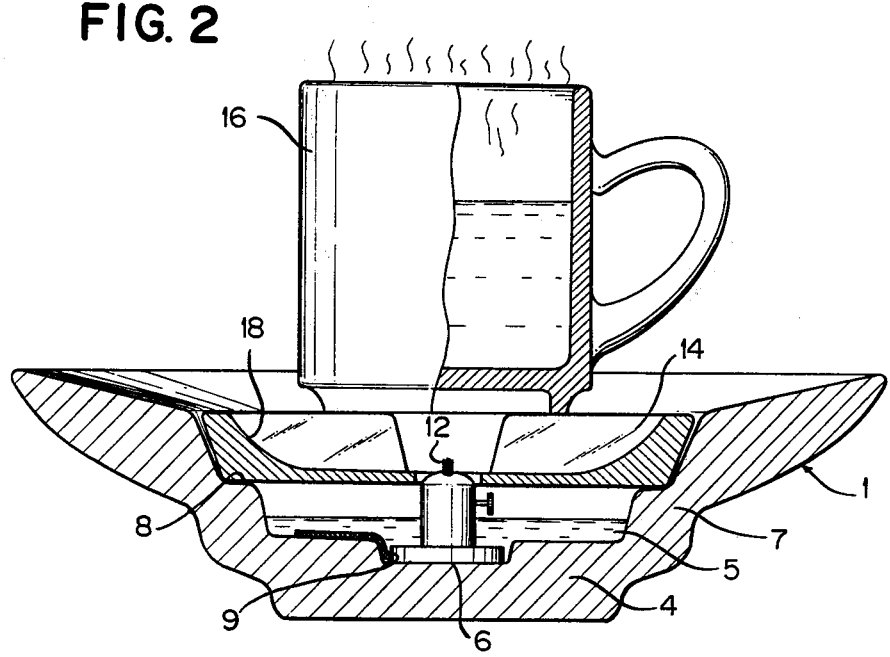
FIG. 2 is a vertical sectional view of the heat-insulating appliance in the working condition.

In the embodiment as shown in FIGS. 1, 2 and 4, there are provided five ribs 15, while in the embodiment as shown in FIGS. 5 and 6, there are provided three ribs 15. The area of the support member is preferably larger than the area of the bottom of the vessel 16 to be supported by the ribs 15. Therefore, a major part of the spaces 14 between the ribs 15 is left uncovered by the bottom of the vessel 16. At the same time, the bottom plane 18 of these spaces 14 is so inclined as to get lower toward the central bore 17 of the support, so as to provide an easy and efficient introduction of the combustion air. The central bore 17a may be provided with projections 19 for engaging the side wall of the head portion 10a inserted therethrough, as shown in FIGS. 5 and 6. For an easier demounting of the support member 3 from the main body 1, the support member may be provided with finger retaining portions 20.

The modification as shown in FIGS. 5 and 6 has somewhat different shapes of the main saucer 1a, wick support 2a and the support member 3a, as compared with the foregoing embodiment as shown in FIGS. 1 to 4. Since the difference has been stated already, no detailed description will be needed here, but to state that the parts corresponding to those of the first embodiment are denoted by the same reference numerals to which is appended a symbol "a".

In operation, as shown in FIG. 1, the wick support 2 is removed after the removal of the support member 3. Then, the fuel pan 5 is filled with a liquid fuel (a fuel composed of 63% of impure ethanol and 35% or more of methanol) up to a suitable level.

In filling the fuel pan, attention must be paid not to cause a spill of the fuel, i.e. not to fill the fuel pan by an amount exceeding the capacity of the same.

Then, after fitting the support member 3 onto the bed 8 for the support member of the saucer-like main body 1, fire is set on the wick 12 projecting from the center of the wick support 2. As a sufficient amount of combustion air is introduced through the spaces between the ribs 15, the fuel sucked up by the wick is burnt stably and safely. The saucer-like main body having a fire set thereon is placed on a dining table, and a vessel such as coffee or tea cup is mounted on the supporting ribs 15, so that the high temperature of coffee or tea is fairly preserved, and the user can enjoy the hot coffee or tea.

The fuel in the fuel pan 5 is allowed to get in contact with the wick, through the supplying groove 9 formed at the base section of the wick support 2, and sucked up to the top portion of the wick due to a capillary action.

Therefore, the duration of combustion can be adjusted by varying the amount of fuel pooled in the fuel pan 5, and the combustion rate, i.e. the strength of the flame can be adjusted by varying the length of projection of the wick 12 from the head portion 10 by means of the adjusting bolt 13.

Thus, according to the critical feature of the invention, the temperature of the contents such as coffee or tea of a cup can be maintained for a long time with an extremely small amount of fuel, so that the user can enjoy a hot drink having a good taste and flavour.

For extinguishing the flame, the user has only to nip or pinch the exposed portion of the wick with his fingers, without being accompanied by substantial danger. In addition, since the shape, construction and design of the saucer-like main body can be selected to match those of the vessel such as cups, it does never spoil the good atmosphere of dinner when placed on the table.

What is claimed is:

1. An apparatus for heating the contents of a vessel, such as a cup containing a beverage, comprising:

a main body of saucer-like shape, said body having a bottom wall, an upwardly extending side wall and an outwardly extending rim, the interior surface of said side wall comprising a lower side wall portion extending upwardly from the perimeter of the upper surface of said bottom wall and a substantially horizontal wall portion extending outwardly from the upper end of said lower side wall portion, said lower side wall portion and said bottom wall together defining a chamber for receiving a liquid fuel, said horizontal wall portion defining a support surface;

a generally horizontal vessel support member removably mounted on said horizontal wall portion, said support member having a substantially horizontal base wall extending across the upper end of said chamber, said base wall having a central opening therethrough, a plurality of spaced-apart ribs extending upwardly from the upper surface of said base wall and adapted for supporting the vessel, the spaces between said ribs communicating with said central opening so that combustion air can flow to said central opening;

a wick support having a base portion removably supported on the upper surface of said bottom wall of said body and having an upwardly extending head portion extending upwardly through said chamber substantially to said central opening in said base wall, and a wick extending from said chamber into said wick support and thence upwardly through said head portion and into said central opening in said base wall.

2. An apparatus according to claim 1 in which the upper surfaces of said ribs lie below the upper edge of said rim.

3. An apparatus according to claim 1 in which the upper surface of said bottom wall of said body has a downwardly offset wall portion in the central region thereof and defining a recess, said base portion of said wick support being positioned in said recess.

4. An apparatus according to claim 1 wherein the bottoms of the spaces between said ribs of said support member are inclined downwardly toward said central opening.

5. An apparatus according to claim 1 in which said central opening is defined by vertically extending boss which is sleeved on the upper end of said head portion of said wick support.

6. An apparatus according to claim 2 in which said support member is circular in plan view and said ribs extend radially from close to the outer edge thereof substantially to said central opening, the upper surfaces of said ribs being substantially horizontal and substantially coplanar.

7. An apparatus according to claim 6 in which said side wall of said body has an upper side wall portion extending upwardly from the perimeter of said horizontal wall portion to the inner edge of said rim, said support member being confined within said upper wall portion.

* * * * *